United States Patent
Hemphill et al.

(10) Patent No.: US 9,933,023 B2
(45) Date of Patent: Apr. 3, 2018

(54) DISCONNECT CLUTCH WITH DUAL ONE-WAY CLUTCHES AND SOLENOID ACTUATOR FOR A WEDGE ONE-WAY CLUTCH

(71) Applicant: Schaeffler Technologies AG & Co. KG, Herzogenaurach (DE)

(72) Inventors: Jeffrey Hemphill, Copley, OH (US); Carsten Ohr, Charlotte, NC (US); Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 346 days.

(21) Appl. No.: 14/681,740

(22) Filed: Apr. 8, 2015

(65) Prior Publication Data

US 2015/0323018 A1 Nov. 12, 2015

Related U.S. Application Data

(60) Provisional application No. 61/989,238, filed on May 6, 2014.

(51) Int. Cl.

| F16D 41/063 | (2006.01) |
|---|---|
| F16D 41/064 | (2006.01) |
| F16D 27/00 | (2006.01) |
| F16D 41/08 | (2006.01) |
| F16D 41/06 | (2006.01) |
| F16D 13/14 | (2006.01) |
| F16D 13/06 | (2006.01) |
| F16D 47/04 | (2006.01) |

(52) U.S. Cl.
CPC .......... *F16D 41/063* (2013.01); *F16D 13/14* (2013.01); *F16D 27/00* (2013.01); *F16D 41/06* (2013.01); *F16D 41/064* (2013.01); *F16D 41/08* (2013.01); *F16D 13/06* (2013.01); *F16D 47/04* (2013.01)

(58) Field of Classification Search
None
See application file for complete search history.

(56) References Cited

U.S. PATENT DOCUMENTS

| 3,107,764 | A | * | 10/1963 | Fulton | F16D 41/063 192/41 R |
| 3,384,214 | A | * | 5/1968 | Wilson | F16D 21/06 192/109 F |
| 3,805,632 | A | * | 4/1974 | Prokop | F16H 61/02 192/103 F |

(Continued)

*Primary Examiner* — Colby M Hansen

(57) ABSTRACT

A disconnect clutch for a torque transfer device for a vehicle, including: an axis of rotation; an input shaft arranged to receive torque from a torque generating or transmitting device for the vehicle; an output shaft arranged to transmit the torque; a forward clutch having a first torque-carrying capacity; a reverse clutch having a second torque-carrying capacity less than the first torque-carrying capacity; and an actuator system. For a forward connect mode in which the input shaft is rotating in a first rotational direction, the actuator system is arranged to close the forward clutch to non-rotatably connect the input and output shafts. For a reverse connect mode in which the input shaft is rotating in a second rotational direction opposite the first rotational direction, the actuator system is arranged to close the reverse clutch to close the reverse clutch to non-rotatably connect the input and output shafts.

18 Claims, 11 Drawing Sheets

(56) References Cited

U.S. PATENT DOCUMENTS

| | | | | |
|---|---|---|---|---|
| 4,134,483 A * | 1/1979 | Horsch | ............... | F16D 25/123 |
| | | | | 188/264 E |
| 4,287,781 A * | 9/1981 | Zenker | .................. | F16H 3/08 |
| | | | | 192/48.613 |
| 4,480,734 A * | 11/1984 | Ishikawa | ............... | F16D 25/10 |
| | | | | 192/109 R |
| 4,607,736 A * | 8/1986 | Kelley | ................ | F16D 67/04 |
| | | | | 192/18 A |
| 4,860,792 A * | 8/1989 | Ichihashi | .......... | F15B 13/0402 |
| | | | | 137/596.17 |
| 5,709,130 A * | 1/1998 | Suzuki | ............... | B63H 23/30 |
| | | | | 192/109 F |
| 6,488,138 B1 * | 12/2002 | Baur | ............... | F16D 25/0638 |
| | | | | 192/106 F |
| 8,424,661 B2 * | 4/2013 | Asatsuke | ............. | F16D 21/04 |
| | | | | 192/48.611 |

* cited by examiner

DISCONNECT CLUTCH WITH DUAL ONE-WAY CLUTCHES AND SOLENOID ACTUATOR FOR A WEDGE ONE-WAY CLUTCH

CROSS-REFERENCE TO RELATED APPLICATIONS

This application claims the benefit under 35 U.S.C. § 119(e) of U.S. Provisional Patent Application No. 61/989,238, filed May 6, 2014, which application is incorporated herein by reference in its entirety.

TECHNICAL FIELD

The present disclosure relates to a disconnect clutch with dual one-way clutches for a torque transfer device, in particular, a disconnect clutch with separate forward and reverse one-way clutches having different torque capacities. The present disclosure also relates to a solenoid for actuating or controlling a one-way wedge clutch.

BACKGROUND

FIG. 10 is a schematic block diagram of an example known vehicle including a power transfer unit. Vehicle V includes engine EN, transmission T, front differential gear FDG, front wheels FW, power transfer unit PTU, rear differential gear RDG, and rear wheels RW. Vehicle V is a front-wheel drive vehicle, that is, when vehicle V is in operation and power is being delivered from the engine to the transmission, torque is always transmitted to the front wheels via gear FDG to move vehicle V. However, power flow to wheels RW via gear RDG is controlled by unit PTU. That is, PTU can connect or disconnect gear RDG from gear FDG.

SUMMARY

According to aspects illustrated herein, there is provided a disconnect clutch for a torque transfer device for a vehicle, including: an axis of rotation; an input shaft arranged to receive torque from a torque generating or transmitting device for the vehicle; an output shaft arranged to transmit the torque; a forward clutch having a first torque-carrying capacity; a reverse clutch having a second torque-carrying capacity less than the first torque-carrying capacity; and an actuator system. For a forward connect mode in which the input shaft is rotating in a first rotational direction, the actuator system is arranged to close the forward clutch to non-rotatably connect the input and output shafts. For a reverse connect mode in which the input shaft is rotating in a second rotational direction opposite the first rotational direction, the actuator system is arranged to close the reverse clutch to close the reverse clutch to non-rotatably connect the input and output shafts.

According to aspects illustrated herein, there is provided a disconnect clutch for a torque transfer device for a vehicle, including: an axis of rotation; an input shaft arranged to receive torque from a torque generating or transmitting device for the vehicle; an output shaft arranged to transmit the torque and including first and second output surfaces at first and second acute angles, respectively, with respect to a radial direction orthogonal to the axis of rotation; a forward one-way clutch; a reverse one-way clutch; and an actuator system. The forward one-way clutch includes: a first inner race non-rotatably connected to the input shaft; and a first wedge plate engaged with the first inner race and including a first wedge surface at the first acute angle with respect to the radial direction and a first width parallel to the axis of rotation. The reverse one-way clutch includes: a second inner race non-rotatably connected to the input shaft; and a second wedge clutch plate engaged with the second inner race and including a second wedge surface at the second acute angle with respect to the radial direction and a second width, parallel to the axis of rotation, less than the first width. The actuator system includes first and second actuators. Respective portions of the first and second output surfaces and the first and second wedge surfaces are aligned such that a line parallel to the axis of rotation passes through the first and second output surfaces and the first and second wedge surfaces. For a forward connect mode in which the input shaft is rotating in a first rotational direction: the first actuator and the at least one spring are arranged to cooperate to displace the first wedge plate to contact the first output and wedge surfaces; and the first wedge plate is arranged to rotate with respect to the first inner race to displace the first wedge plate radially outward to non-rotatably connect the first inner race and the output shaft. For a reverse connect mode in which the input shaft is rotating in a second rotational direction opposite the first rotational direction: the second actuator and the at least one spring are arranged to cooperate to displace the second wedge to contact the second output and wedge surfaces; and the second wedge plate is arranged to rotate with respect to the second inner race to displace the second wedge plate radially outward to non-rotatably connect the second inner race and the output shaft.

According to aspects illustrated herein, there is provided a switchable one-way clutch, including: an axis of rotation; a first shaft; a second shaft; and a clutch assembly including an inner race non-rotatably connected to the first shaft and including a first plurality of circumferentially disposed ramps; an outer race non-rotatably connected to the second shaft and including a clutch surface at an acute angle with respect to a first line orthogonal to the axis of rotation; a wedge plate; and a solenoid including a coil. The wedge plate includes: a second plurality of circumferentially disposed ramps engaged with the first plurality of circumferentially disposed ramps; and a radially outermost portion including a wedge plate surface at the first angle with respect to a second line orthogonal to the axis of rotation. To close the one-way clutch for relative rotation of the first and second shafts in a first direction: the solenoid is arranged to be energized by electrical current to generate a magnetic field; the magnetic field is arranged to draw the wedge plate toward the solenoid in a first axial direction, parallel to the axis of rotation, to contact the clutch surface and the wedge plate surface; and contact of the clutch and wedge plate surfaces is arranged to rotate the first and second pluralities of ramps with respect to each other in the first direction to displace the wedge plate radially outward to non-rotatably connect the first and second shafts.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
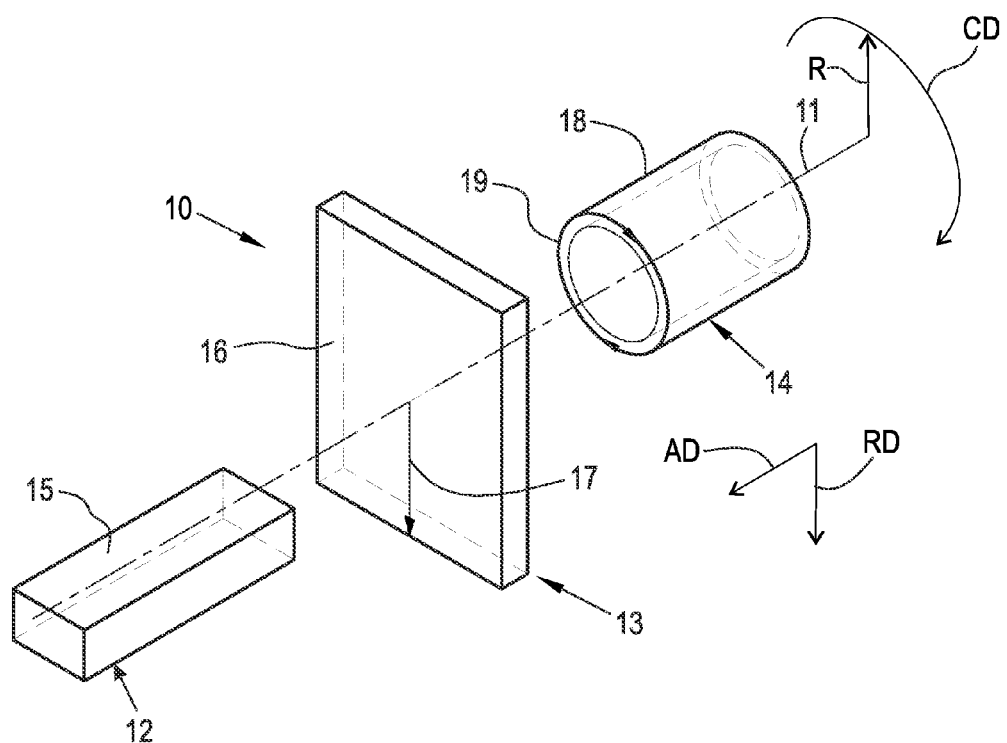
FIG. 1 is a perspective view of a cylindrical coordinate system demonstrating spatial terminology used in the present patent.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15; however it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

Figure 2:
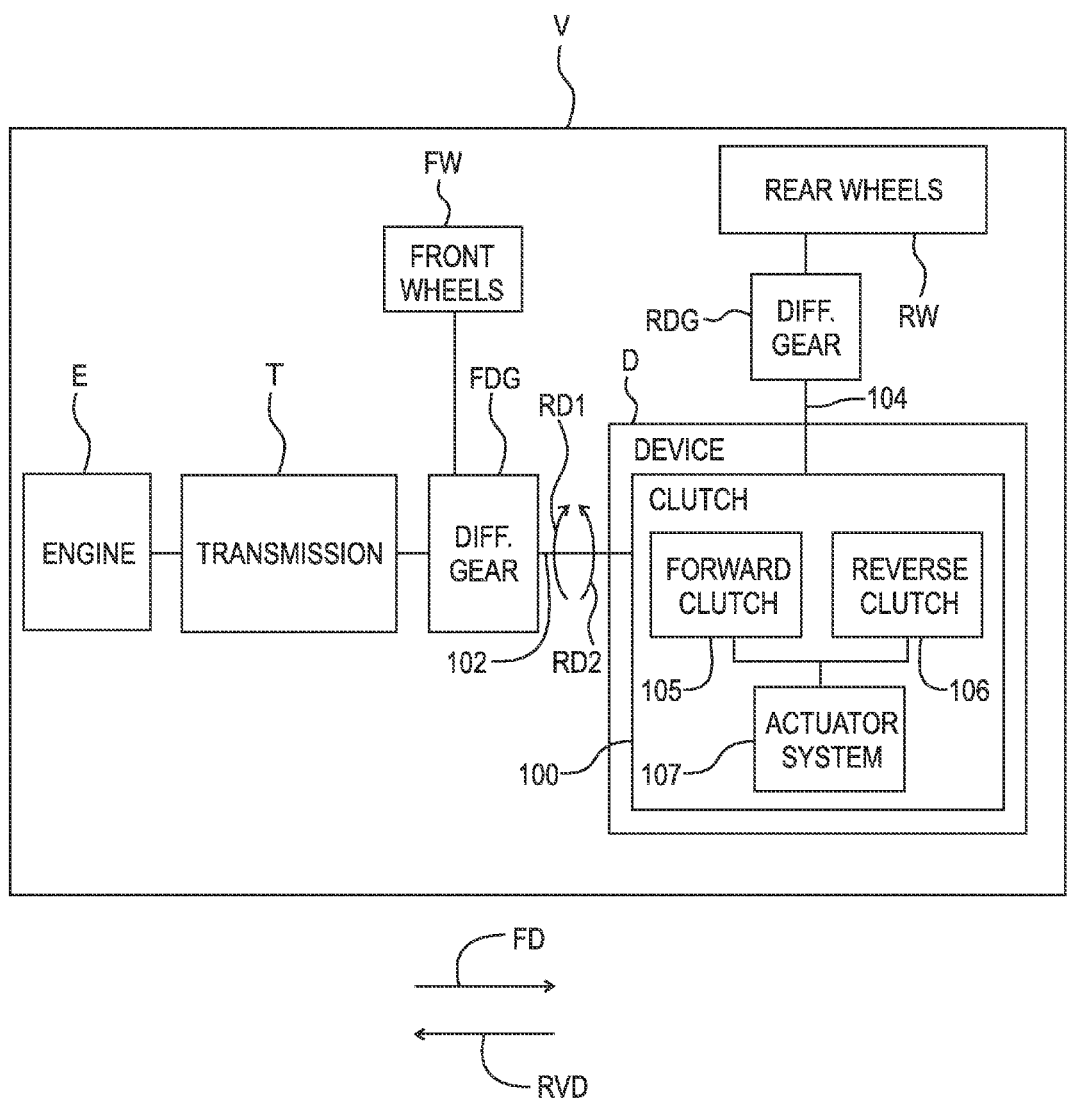
FIG. 2 is a schematic block diagram of a disconnect clutch with forward and reverse clutches having different torque capacities.

FIG. 2 is a schematic block diagram of disconnect clutch 100 with forward and reverse clutches having different torque capacities. Clutch 100 includes input shaft 102, output shaft 104, forward clutch 105, reverse clutch 106, and actuator system 107. Input shaft 102 is arranged to receive torque, for example, from torque generating or transmitting device D, for example, differential gear FDG, for vehicle V. Output shaft 104 is arranged to transmit the torque. In an example embodiment, device D is a power transfer unit and output shaft 104 is arranged to transmit torque to rear wheels RW via differential gear RDG. In an example embodiment, device D is connected to differential gear FDG, which in turn is connected to engine E. Clutch 100 is usable to controllably connect and disconnect an input shaft from any torque-producing or transmitting element with an output shaft. Although a particular example configuration is shown in FIG. 2, is should be understood that device D could be directly connected to transmission T or engine E or could be part of another component of vehicle V.

Forward clutch 105 has a torque-carrying capacity, and reverse clutch 106 has a torque-carrying capacity less than the torque-carrying capacity for clutch 105. For a forward connect mode in which the input shaft is rotating in a first direction for example, RD1, with respect to the output shaft, actuator system 107 is arranged to close clutch 105 to non-rotatably connect the input and output shafts. For a reverse connect mode in which the input shaft is rotating in a second direction opposite the first direction, for example, RD2, with respect to the output shaft, actuator system 107 is arranged to close reverse clutch 106 to non-rotatably connect the input and output shafts. Directions RD1 and RD2 are used as examples of the forward and reverse directions in the discussion that follows; however, it should be understood that directions RD1 and RD2 can be reversed.

Figure 3:
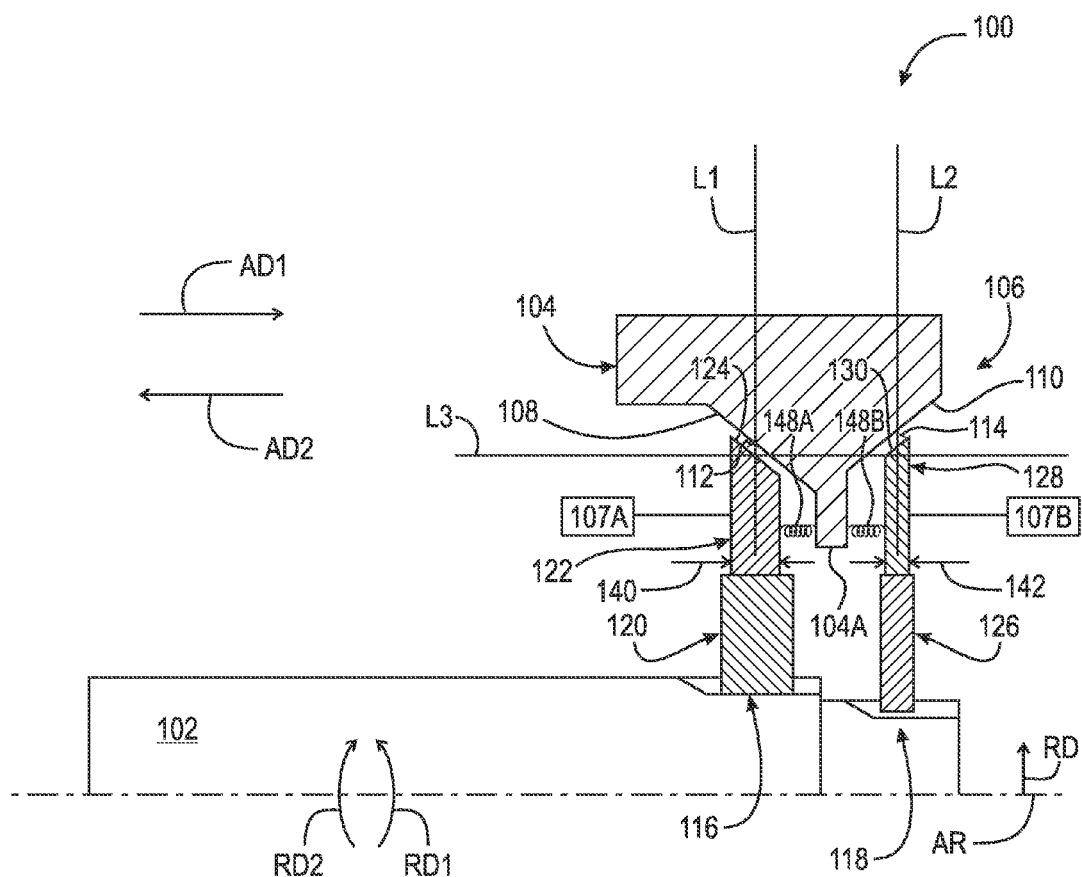
FIG. 3 is a schematic representation of an example embodiment of a normally disconnect clutch in FIG. 2 with two springs.

FIG. 3 is a schematic representation of an example embodiment of normally disconnect clutch 100 in FIG. 2 with two springs.

Figure 4:
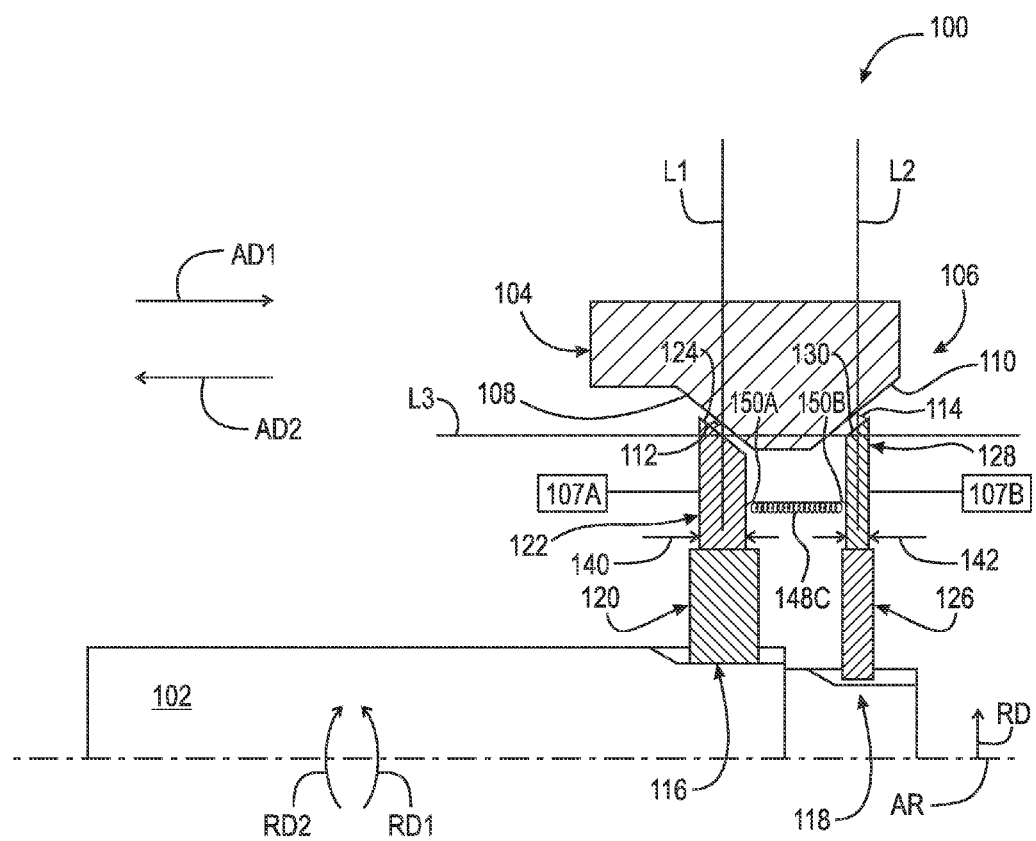
FIG. 4 is a schematic representation of an example embodiment of a normally open disconnect clutch in FIG. 2 with a single spring.

FIG. 4 is a schematic representation of an example embodiment of a normally open disconnect clutch 100 in FIG. 2 with a single spring. The following should be viewed in light of FIGS. 2 through 4. In an example embodiment, clutch 100 includes axis of rotation AR, and output shaft 104 includes output surfaces 108 and 110 at acute angles 112 and 114, respectively, with respect to lines L1 and L2, respectively, in radial direction RAD orthogonal to axis of rotation AR. In an example embodiment, angles 112 and 114 are equal. Clutch 105 includes inner race 120 non-rotatably connected to input shaft 102 and wedge plate 122 engaged with inner race 120 and including wedge surface 124 at acute angle 112 with respect to line L1. Clutch 106 includes inner race 126 non-rotatably connected to input shaft 102 and wedge plate 128 engaged with inner race 126 and including wedge surface 130 at acute angle 114 with respect to line L2. Respective portions of surfaces 108, 124, 110, and 130 are aligned such that line L3, parallel to axis of rotation AR, passes through surfaces 108, 124, 110, and 130.

In an example embodiment, actuator system 107 includes actuators 107A and 107B. For a forward connect mode in which input shaft 102 is rotating, for example, in a rotational direction RD1, with respect to output shaft 104, to propel vehicle V in forward direction FD: actuator 107A is arranged to displace wedge 122 in axial direction AD1, parallel to axis of rotation AR, to contact surfaces 108 and 124. The contact of surfaces 108 and 124 is arranged to rotate wedge plate 122 with respect to inner race 120 to displace wedge plate 122 radially outward to non-rotatably inner race 120 and output shaft 104.

For a reverse connect mode in which input shaft 102 is rotating, for example, in rotational direction RD2, opposite direction RD1, with respect to output shaft 104, to propel vehicle V in reverse direction RVD: actuator 107B is arranged to displace wedge plate 128 axial direction AD2, opposite direction AD1, to contact surfaces 110 and 130. The contact of surfaces 110 and 130 is arranged to rotate wedge plate 128 with respect to inner race 126 to displace wedge plate 128 radially outward to non-rotatably inner race 126 and output shaft 104. In an example embodiment, input shaft 102 is arranged to receive torque from front differential gear FDG connected to transmission T. Although directions RD1 and RD2 are shown in a particular configuration in FIGS. 3 and 4, it should be understood that the configuration can be reversed.

Once clutch 100 is in the forward or reverse mode, clutch 100 remains in the forward and reverse mode as long as torque is transmitted through input shaft 102 to clutches 116 and 118. In coast mode, torque flow is reverse and torque is transmitted from wheels RW to output shaft 104A. For a switch from the forward mode to the coast mode, wedge plate 122 is arranged to rotate with respect to the inner race 120 to enable independent rotation of the wedge plate 122 and output shaft 104A.

Figure 5:
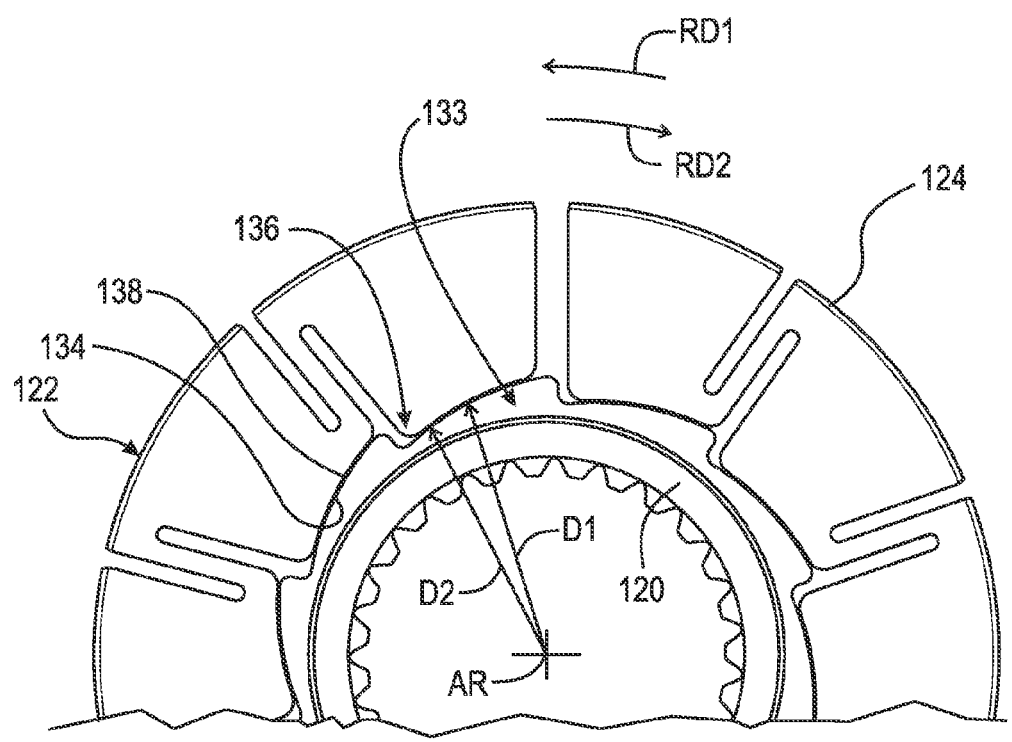
FIG. 5 is a schematic representation of respective ramps for an inner race and associated wedge plate for the clutch shown in FIGS. 3 and 4.

FIG. 5 is a schematic representation of respective ramps for an inner race and associated wedge plate for the clutch shown in FIGS. 3 and 4. The following should be viewed in light of FIGS. 2 through 5. The following is directed to inner race 120 and wedge plate 122; however, it should be understood that the discussion is applicable to inner race 126 and wedge plate 128 as well. In an example embodiment inner race 120 includes circumferentially disposed ramps 133 with surfaces 134 and wedge plate 122 includes circumferentially disposed ramps 136 with surfaces 138 engaged with ramps 133.

The operation of circumferentially disposed ramps in a wedge clutch is known. The following provides a brief summary of the operation of ramps 133 and 136. As noted above, to initiate the forward mode, with input shaft 102 rotating in direction RD1, surface 108 is placed in contact with surface 124. The frictional contact of the surfaces rotationally locks wedge plate 122 or causes relative rotation of inner race 120 in direction RD1 with respect to wedge plate 122. The locking or relative rotation causes ramps 133 to slide up ramps 136 in direction RD1. Since radial distance D1 for surfaces 134 increases in direction RD2 and radial distance D2 for surfaces 138 increases in direction RD2, ramps 133 push ramps 136 and surface 124 of wedge plate 122, radially outward so that ramps 133 and 136 non-rotatably connect and surfaces 108 and 124 non-rotatably connect. As a result, shafts 102 and 104 are non-rotatably connected.

As noted above, cessation or rotation of input shaft 102 in direction RD1 or rotation of output shaft 104 in RD1 in coast mode, opens clutch 116. Specifically, the cessation of rotation of shaft 102 or the rotation of shaft 104 causes ramps 136 to slide down ramps 133 in direction RD1, relieving the radially outward force described above and breaking the non-rotatable connection of surfaces 108 and 124. The preceding discussion is applicable to inner race 126, wedge plate 128, and operation in reverse connection mode.

Wedge plate 122 has thickness 140 in axial direction AD1 greater than thickness 142 for wedge plate 128 in direction AD1. In an example embodiment, thickness 140 is at least twice thickness 142. The respective torque-carrying capacity of clutches 104 and 105 is directly related to thicknesses 140 and 142, specifically, increasing thicknesses 140 and 142, increases the torque-carrying capacities of clutches 104 and 105, respectively.

In an example embodiment, clutch 106 includes at least one spring 148 urging wedge plates 122 and 128 in axial directions AD2 and AD1, respectively. In FIG. 3, springs 148A and 148B, attached to portion 104A of shaft 104, urge wedge plates 122 and 130 in axial directions AD2 and AD1, respectively. To initiate the forward mode, actuator 107A is arranged to displace wedge plate 122 in axial direction AD1 against the urging of spring 148A. To initiate the reverse mode, actuator 107B is arranged to displace wedge plate 128 in axial direction AD2 against the urging of spring 148B. Thus, springs 148A and 148B create a normally open configuration for clutches 116 and 118, respectively. That is, in the absence of pressure or displacement by actuators 107A and 107B, springs 148A and 148B open clutches 116 and 118, respectively.

In FIG. 4, axial ends 150A and 150B of single spring 148C are attached to wedge plates 122 and 128, respectively, and urge wedge plates 122 and 128 in axial directions AD2 and AD1, respectively. To initiate the forward mode, actuator 107A is arranged to displace wedge plate 122 in axial direction AD1 against the urging of spring 148C. To initiate the reverse mode, actuator 107B is arranged to displace wedge plate 128 in axial direction AD2 against the urging of spring 148C. Thus, spring 148C creates a normally open configuration for clutch 100. That is, in the absence of pressure or displacement by actuators 107A and 107B, spring 148C opens clutches 116 and 118.

For a normally open clutch 100, to switch from the reverse mode to the forward mode, input shaft 102 is arranged to rotate in direction RD2, with respect to output shaft 104, causing wedge plate 128 to rotate with respect to inner race 126 to enable independent rotation of inner race 126 and the output shaft and actuator 107B is deactivated, causing clutch 118 to open. Actuator 107A is activated to displace wedge plate 122 in direction AD1 and non-rotatably connect shafts 102 and 104 as described above.

For a normally open clutch 100, to switch from the forward mode to the reverse mode, input shaft 102 is arranged to rotate in direction RD1, with respect to output shaft 104, causing wedge plate 122 to rotate with respect to inner race 120 to enable independent rotation of inner race 120 and the output shaft and actuator 107A is deactivated, causing clutch 116 to open. Actuator 107B is activated to displace wedge plate 128 in direction AD2 and non-rotatably connect shafts 102 and 104 as described above.

Figure 6:
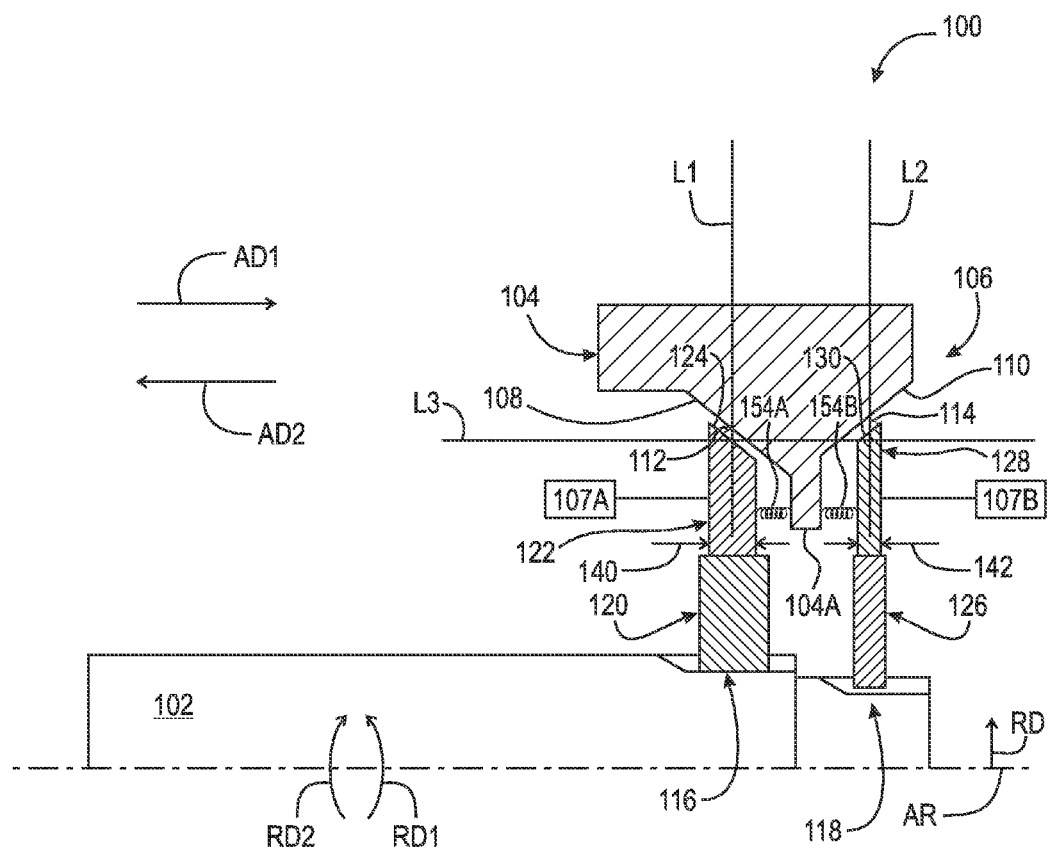
FIG. 6 is a schematic representation of an example embodiment of a normally closed disconnect clutch in FIG. 2 with two springs.

FIG. 6 is a schematic representation of an example embodiment of a normally closed disconnect clutch in FIG. 2 with two springs.

Figure 7:
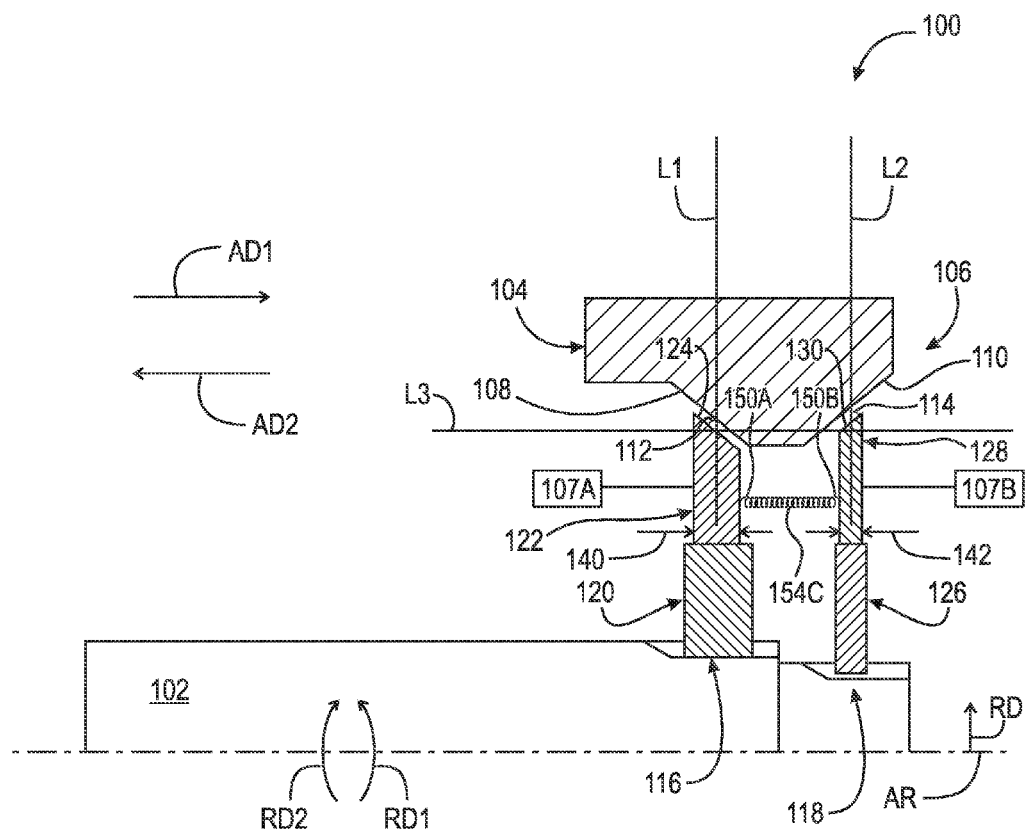
FIG. 7 is a schematic representation of an example embodiment of a normally closed disconnect clutch in FIG. 2 with one spring.

FIG. 7 is a schematic representation of an example embodiment of a normally closed disconnect clutch in FIG. 2 with one spring. The discussion for FIGS. 2 through 5 is applicable to FIGS. 6 and 7 except as noted below. In the example of FIG. 6, actuator assembly 107 includes springs 154A and 154B. In an example embodiment, springs 154A and 154B urge wedge plates 122 and 128 in axial directions AD1 and AD2, respectively. To initiate the forward mode, actuator 107A is deactivated to enable spring 154A to pull surfaces 108 and 124 into contact, causing clutch 116 to close and non-rotatably connect shafts 102 and 104 as described above. To initiate the reverse mode, actuator 107B is deactivated to enable spring 154B to pull surfaces 110 and 130 into contact, causing clutch 118 to close and non-rotatably connect shafts 102 and 104 as described above.

In the example of FIG. 7 actuator assembly 107 includes spring 154C. In an example embodiment, spring 154C urges wedge plates 122 and 128 in axial directions AD1 and AD2, respectively. To initiate the forward mode, actuator 107A is deactivated to enable spring 154C to pull surfaces 108 and 124 into contact, causing clutch 116 to close and non-rotatably connect shafts 102 and 104 as described above. To initiate the reverse mode, actuator 107B is deactivated to enable spring 154C to pull surfaces 110 and 130 into contact, causing clutch 118 to close and non-rotatably connect shafts 102 and 104 as described above.

For a normally closed clutch 100, to switch from the reverse mode to the forward mode, input shaft 102 is arranged to rotate in direction RD1, with respect to output shaft 104, causing wedge plate 128 to rotate with respect to inner race 126 to enable independent rotation of inner race 126 and the output shaft. Actuator 107A is deactivated, causing clutch 116 to close and non-rotatably connect shafts 102 and 104 as described above and actuator 107B is actuated to displace wedge plate 128 in direction AD1.

For a normally closed clutch 100, to switch from the forward connect mode to the reverse connect mode, input shaft 102 is arranged to rotate in direction RD2, with respect to output shaft 104, causing wedge plate 122 to rotate with respect to inner race 120 to enable independent rotation of inner race 120 and the output shaft. Actuator 107B is deactivated, causing clutch 118 to close and non-rotatably connect shafts 102 and 104 as described above and actuator 107A is actuated to displace wedge plate 122 in direction AD2.

In an example embodiment (not shown), actuator system 107 includes respective actuators for clutches 105 and 106 and each actuator can be: an electric motor with a ball screw engageable with the respective wedge plate to open and close the respective clutch; a magnet arranged to axially displace the respective wedge plate to open and close the respective clutch; or a solenoid arranged to axially displace the respective wedge plate to open and close the respective clutch. It should be understood that the respective actuators can be different from each other. For example, clutch 105 can include an actuator with an electric motor and ball screw and clutch 106 can include an actuator with a magnet.

Figure 8A:
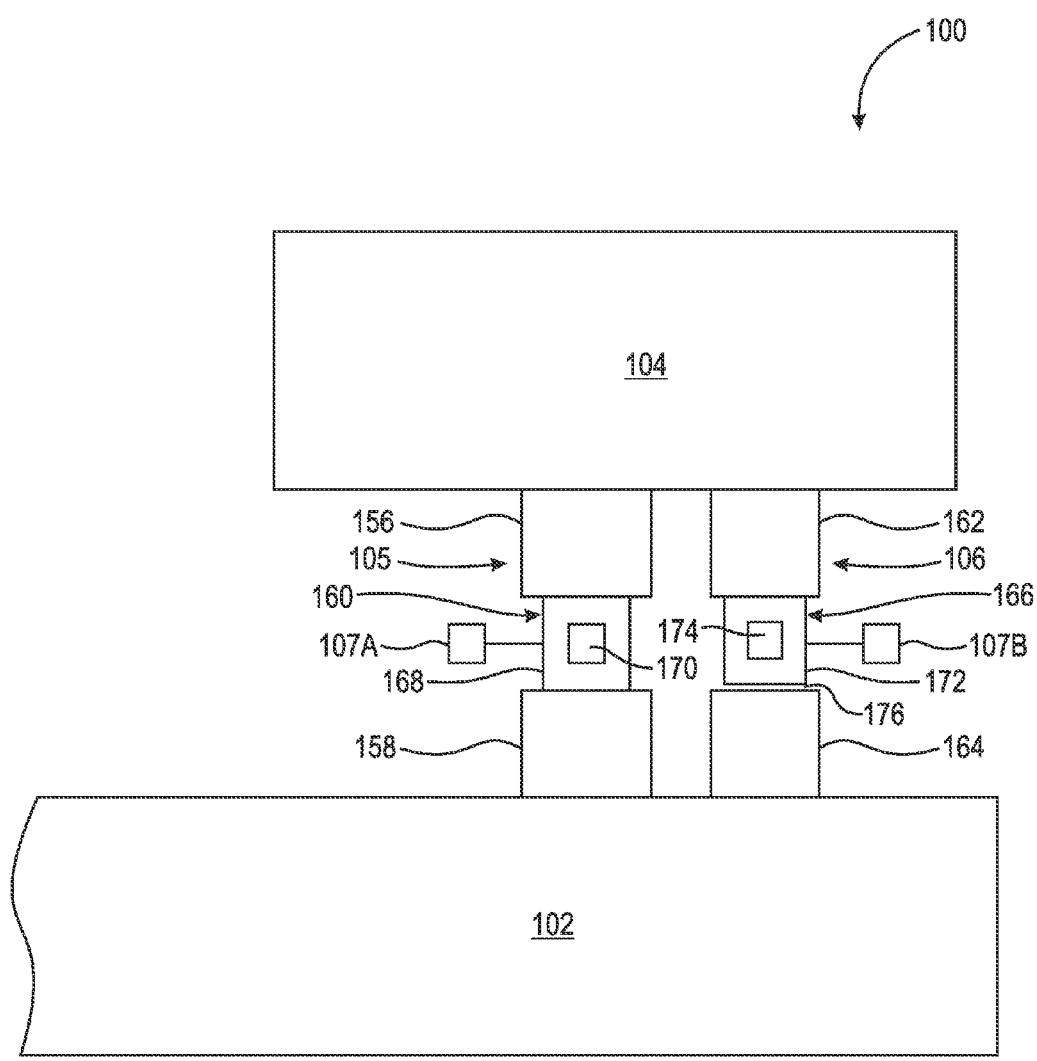
FIG. 8A is a schematic representation of an example embodiment of the torque transfer device in FIG. 2 with one-way clutches including rolling assemblies in a forward connect mode.

FIG. 8A is a schematic representation of an example embodiment of the torque transfer device in FIG. 2 with one-way clutches including rolling assemblies in a forward connect mode.

Figure 8B:
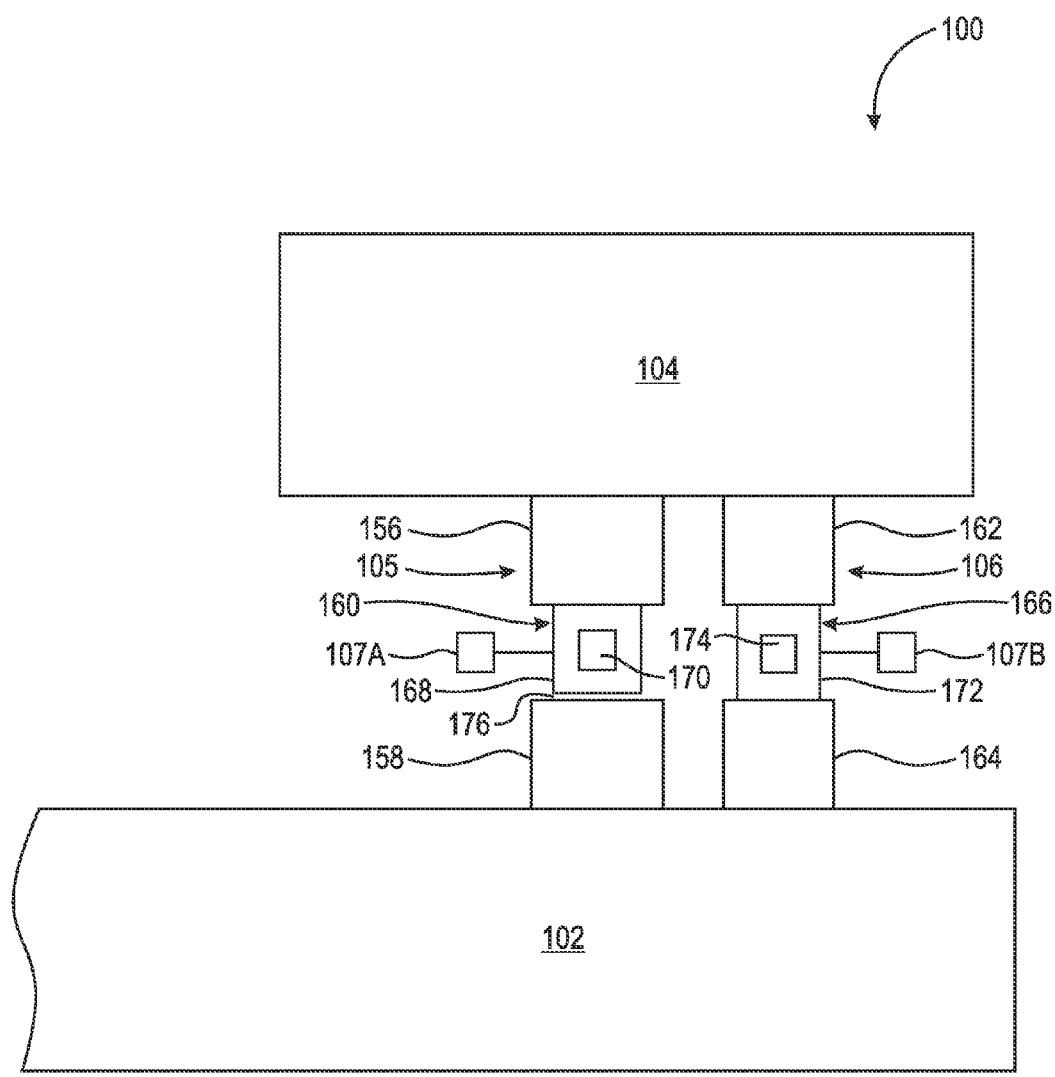
FIG. 8B is a schematic representation of an example embodiment of the torque transfer device in FIG. 8A in a reverse connect mode.

FIG. 8B is a schematic representation of an example embodiment of the torque transfer device in FIG. 8A in a reverse connect mode. The following should be viewed in light of FIGS. 8A and 8B. In the example embodiment of FIGS. 8A and 8B, forward clutch 105 is a one-way clutch including outer ring 156 non-rotatably connected to output shaft 104, inner ring 158 non-rotatably connected to input shaft 102; and rolling element assembly 160 radially disposed between rings 156 and 158. In an example embodiment, reverse clutch 106 is a one-way clutch including outer ring 162 non-rotatably connected to output shaft 104, inner ring 164 non-rotatably connected input shaft 102, and rolling element assembly 166 radially disposed between rings 162 and 164. Actuator system 107 is arranged to rotationally lock rolling assembly 166 for the forward connect mode, and to rotationally lock rolling assembly 160 for the reverse connect mode. By rotationally locking assemblies 160 and 166, clutches 105 and 106 are able to operate as one-way clutches and close for example, for rotation of input shaft 102 in directions RD1 and RD2, respectively, with respect to output shaft 104.

One-way clutches 105 and 106 can be any one-way clutches known in the art. In an example embodiment, rolling assembly 160 includes cage 168 and engagement elements 170 at least partially contained within cage 168. In an example embodiment, rolling assembly 166 includes cage 172 and engagement elements 174 at least partially contained within cage 172. Engagement elements can be any engagement elements known in the art, including, but not limited to sprags, rollers, or balls. In an example embodiment, actuator 107A is arranged to rotationally lock cage 172 for the forward connect mode, which prevents clutch 106 from closing. For example, by locking cage 172, gap 176 is formed between ring 164 and cage 172 and elements 174 are prevented from non-rotatably connecting rings 162 and 164. In an example embodiment, actuator system 107B is arranged to rotationally lock cage 168 for the reverse connect mode, which prevents clutch 105 from closing. For example, by locking cage 168, gap 176 is formed between ring 158 and cage 168 and elements 170 are prevented from non-rotatably connecting rings 162 and 164.

Advantageously, clutch 100 is compact and provides reliable switching between forward and reverse modes for torque transfer. For a typical torque transfer device including clutch 100, operation in a forward mode occurs for a much larger percentage of the operating time than reverse mode. Thus, the torque-carrying requirement for the forward mode is greater than for the reverse mode. Advantageously, clutch 100 accounts for the preceding torque-carrying differential. Specifically, the torque-carrying capacity, and subsequently the size, of clutch 106 is correlated to the actual diminished requirement for clutch 106. Minimizing the size of clutch 106 advantageously minimizes the size of clutch 100 and a torque transfer device including clutch 100. In addition, one-way clutches are more compact that other types of clutches, further reducing the size of clutch 100.

Figure 9:
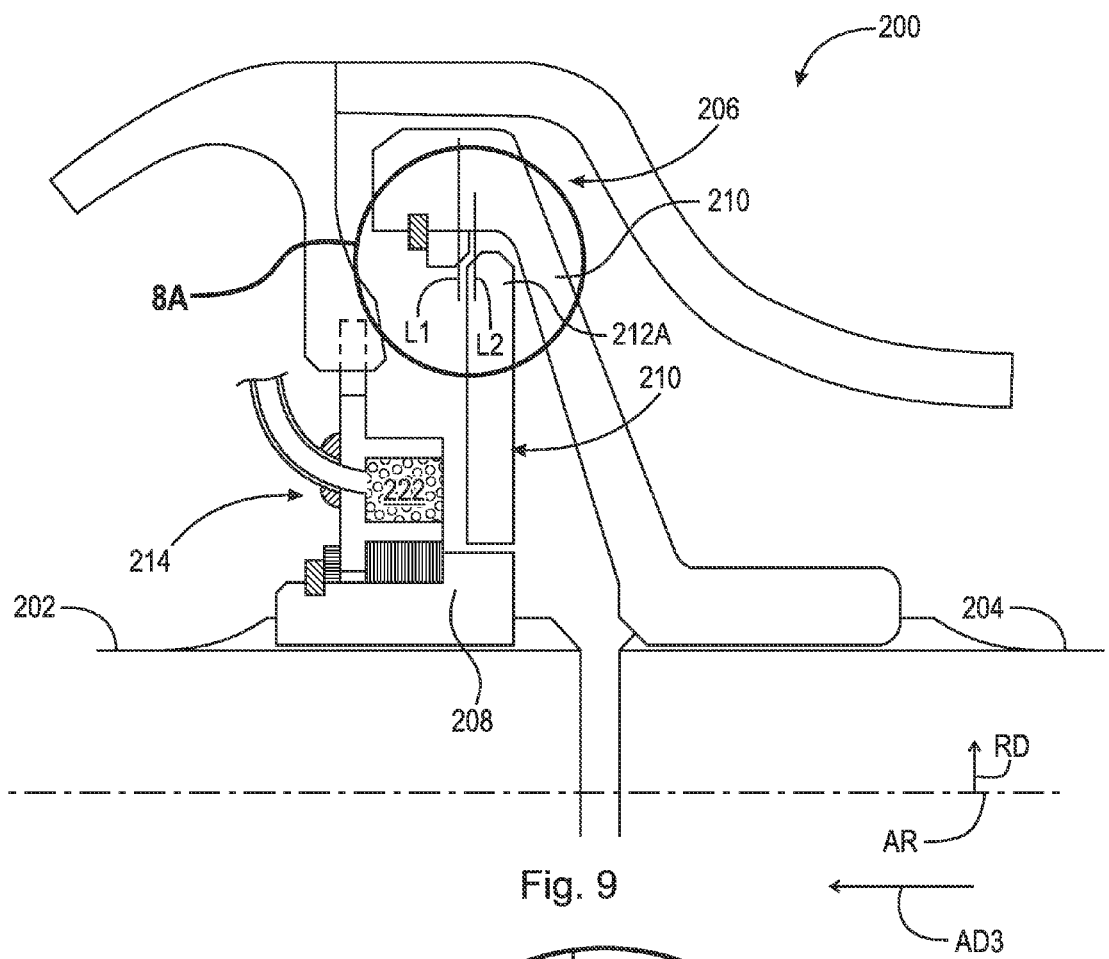
FIG. 9 is a schematic representation of switchable a one-way clutch with a solenoid actuator.

FIG. 9 is a schematic representation of switchable a one-way clutch 200 with a solenoid actuator.

Figure 9A:
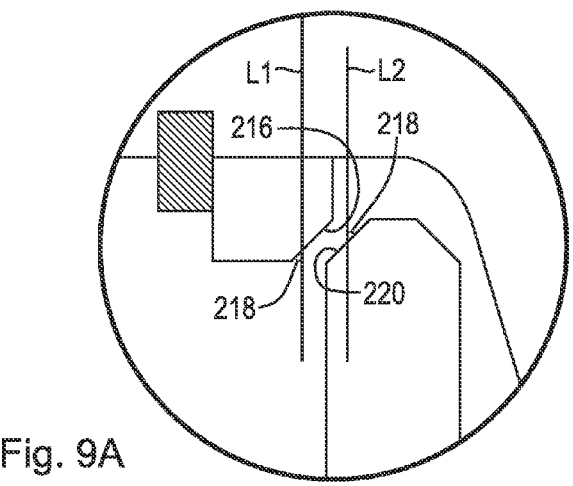
FIG. 9A is a detail of FIG. 9.
Figure 10:
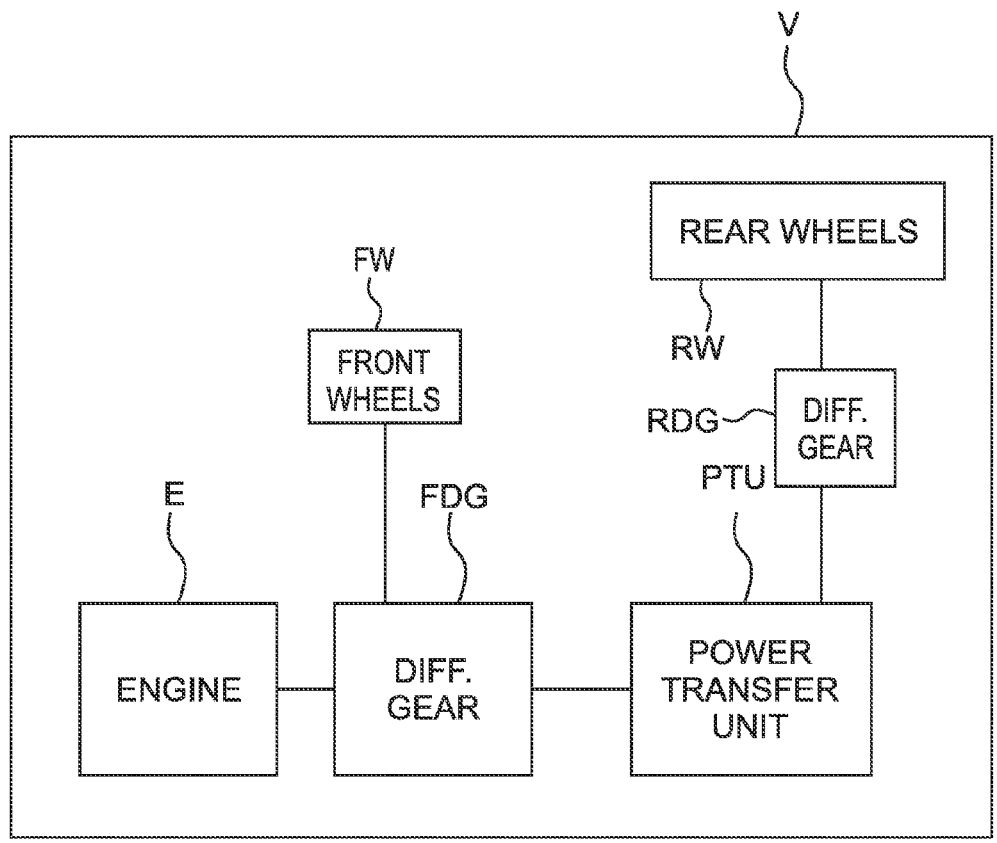
FIG. 10 is a schematic block diagram of an example known vehicle including a power transfer unit.
Figure 10:
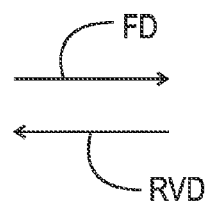

FIG. 9A is a detail of FIG. 9. Clutch 200 includes axis of rotation AR, shafts 202 and 204 and clutch assembly 206. Clutch assembly 206 includes inner race 208, outer race 210, wedge plate 212, and solenoid 214. Race 208 is non-rotatably connected to shaft 202. Outer race 210 includes clutch surface 216 at acute angle 218 with respect to line L1 parallel to direction RD. Wedge plate 212 includes radially outermost portion 212A including wedge plate surface 220 at angle 218 with respect to line L2 parallel to direction RD. Solenoid 214 includes coil 222. The discussion for FIG. 4 is applicable to inner race 208 and wedge plate 212. That is, inner race 208 and wedge plate 212 have complimentary/engaged ramps analogous to ramps 122 and 126, respectively.

To close clutch 200 for relative rotation of the shafts in direction RD1 or RD2, solenoid 214 is arranged to be energized by electrical current to generate a magnetic field. The magnetic field is arranged to draw wedge plate 212 toward solenoid 214 in axial direction AD2, parallel to axis of rotation AR, to contact clutch surface 218 and wedge plate surface 220. As described above for clutch 100 and wedge plates 122 and 128, contact between clutch surface 218 and wedge plate surface 220 is arranged to displace wedge plate 212 radially outward to non-rotatably connect shafts 202 and 204. Once shafts 202 and 204 are non-rotatably connected, the solenoid is arranged to be de-energized. That is, the solenoid is not needed to maintain the non-rotatable connection of shafts 202 and 204 as long as the relative rotation that initiated the connection remains.

For relative rotation of shafts 202 and 204 in a direction, opposite the direction of relative rotation that initiated non-rotatable connection of shafts 202 and 204, relative rotation of wedge plate 212 and shaft 104 is enabled, for example as described for clutch 100 and wedge plates 122 and 128, to enable independent rotation of shafts 202 and 204.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A disconnect clutch for a torque transfer device for a vehicle, comprising:
    an axis of rotation;
    an input shaft arranged to receive torque from a torque generating or transmitting device for the vehicle;
    an output shaft arranged to transmit the torque;
    a forward clutch having a first torque-carrying capacity;
    a reverse clutch having a second torque-carrying capacity less than the first torque-carrying capacity; and,
    an actuator system, wherein:
        for a forward connect mode in which the input shaft is rotating in a first rotational direction, the actuator system is arranged to close the forward clutch to non-rotatably connect the input and output shafts; and,
        for a reverse connect mode in which the input shaft is rotating in a second rotational direction opposite the first rotational direction, the actuator system is arranged to close the reverse clutch to non-rotatably connect the input and output shafts.

2. The disconnect clutch of claim 1, wherein:
    the output shaft includes first and second output surfaces;
    the actuator system includes first and second actuators and at least one spring;
    the forward clutch includes:
        a first inner race non-rotatably connected to the input shaft; and,
        a first wedge plate engaged with the first inner race and including:
            a first wedge surface at a first acute angle with respect to a radial direction orthogonal to the axis of rotation; and,
            a first width in a first axial direction parallel to the axis of rotation;
    the reverse clutch includes:
        a second inner race non-rotatably connected to the input shaft; and,
        a second wedge clutch plate engaged with the second inner race and including:
            a second wedge surface at a second acute angle with respect to the radial direction; and,
            a second width, in the first axial direction, less than the first width;
    respective portions of the first and second output surfaces and of the first and second wedge surfaces are aligned such that a line parallel to the axis of rotation passes through the first and second output surfaces and the first and second wedge surfaces;
    for the forward connect mode:
        the first actuator and the at least one spring are arranged to cooperate to displace the first wedge plate to contact the first output surface with the first wedge surface; and,
        the first wedge plate is arranged to rotate with respect to the first inner race to displace the first wedge plate radially outward to non-rotatably connect the first inner race and the output shaft; and,
    for the reverse connect mode:
        the second actuator and the at least one spring are arranged to cooperate to displace the second wedge plate to contact the second output surface with the second wedge surface; and,
        the second wedge plate is arranged to rotate with respect to the second inner race to displace the second wedge plate radially outward to non-rotatably connect the second inner race and the output shaft.

3. The disconnect clutch of claim 2, wherein the first width is at least twice the second width.

4. The disconnect clutch of claim 2, wherein:
    the at least one spring urges the first and second wedge plates in a second axial direction opposite the first axial direction, and in the first axial direction, respectively;
    to initiate the forward mode, the first actuator is arranged to displace the first wedge plate in the first axial direction; and,
    to initiate the reverse mode, the second actuator is arranged to displace the second wedge plate in the second axial direction.

5. The disconnect clutch of claim 4, wherein the at least one spring includes:
    a first spring connected to the output shaft and the first wedge plate and urging the first wedge plate in the second axial direction; and,
    a second spring connected to the output shaft and the second wedge plate and urging the second wedge plate in the first axial direction.

6. The disconnect clutch of claim 4, wherein the at least one spring includes a single spring with first and second axial ends connected to the first wedge plate and the second wedge plate, respectively.

7. The disconnect clutch of claim 2, wherein:
    the at least one spring urges the first and second wedge plates in the first axial direction and in a second axial direction opposite the first axial direction, respectively; and,
    for the forward connection mode:
        the first actuator is arranged to be deactivated to enable the at least one spring to displace the first wedge plate in the first direction to bring the first clutch surface and the first wedge plate surface into contact to non-rotatably connect the first inner race and the output shaft; and,
        the second actuator is arranged to be active to displace the second wedge plate in the first axial direction to prevent contact of the second clutch surface with the second wedge plate surface.

8. The disconnect clutch of claim 7,
wherein the at least one spring includes:
a first spring connected to the output shaft and the first wedge plate and urging the first wedge plate in the first axial direction; and,
a second spring connected to the output shaft and the second wedge plate and urging the second wedge plate in the second axial direction.

9. The disconnect clutch of claim 2, wherein:
the at least one spring urges the first and second wedge plates in the first axial direction and in a second axial direction opposite the first axial direction, respectively; and,
for the reverse connection mode:
the second actuator is arranged to be deactivated to enable the at least one spring to displace the second wedge plate in the second direction to bring the second clutch surface and the second wedge plate surface into contact to non-rotatably connect the second inner race and the output shaft; and,
the first actuator is arranged to be active to displace the first wedge plate in the second axial direction to prevent contact of the first clutch surface with the first wedge plate surface.

10. The disconnect clutch of claim 9,
wherein the at least one spring includes:
a first spring connected to the output shaft and the first wedge plate and urging the first wedge plate in the first axial direction; and,
a second spring connected to the output shaft and the second wedge plate and urging the second wedge plate in the second axial direction.

11. The disconnect clutch of claim 1, wherein:
the forward clutch is a first one-way clutch including:
a first outer ring non-rotatably connected to the output shaft;
a first inner ring non-rotatably connected to the input shaft; and,
a first rolling element assembly radially disposed between first outer ring and the first inner ring;
the reverse clutch is a second one-way clutch including:
a second outer ring non-rotatably connected to the output shaft;
a second inner ring non-rotatably connected to the input shaft; and,
a second rolling element assembly radially disposed between second outer ring and the second inner ring; and,
the actuator system is arranged to:
rotationally lock the second rolling assembly for the forward connect mode; and,
rotationally lock the first rolling assembly for the reverse connect mode.

12. The disconnect clutch of claim 11, wherein:
the first rolling assembly includes a first cage and a first plurality of engagement elements:
at least partially contained within the first cage; and,
selected from the group consisting of sprags, rollers, and balls;
the second rolling assembly includes a second cage and a second plurality of engagement elements:
at least partially contained within the second cage; and,
selected from the group consisting of sprags, rollers, or balls; and,
the actuator system is arranged to:
rotationally lock the second cage for the forward connect mode; and,
rotationally lock the first rolling assembly for the reverse connect mode.

13. The disconnect clutch of claim 1, wherein:
the forward clutch includes a first wedge plate;
the reverse clutch includes a second wedge plate; and,
the actuator system includes:
first and second electric motors with first and second ball screws, respectively, engageable with the first and second wedge plates, respectively, the first electrical motor and the first ball screw arranged to axially displace the first wedge plate to open and close the forward clutch and the second ball screw arranged to axially displace the second wedge plate to open and close the reverse clutch; or,
a first magnet arranged to axially displace the first wedge plate to open and close the forward clutch and a second magnet arranged to axially displace the second wedge plate to open and close the reverse clutch.

14. A disconnect clutch for a torque transfer device for a vehicle, comprising:
an axis of rotation;
an input shaft arranged to receive torque from a torque generating or transmitting device for the vehicle;
an output shaft arranged to transmit the torque and including first and second output surfaces at first and second acute angles, respectively, with respect to a radial direction orthogonal to the axis of rotation;
a forward clutch including:
a first inner race non-rotatably connected to the input shaft; and,
a first wedge plate engaged with the first inner race and including:
a first wedge surface at the first acute angle with respect to the radial direction; and,
a first width parallel to the axis of rotation;
a reverse clutch including:
a second inner race non-rotatably connected to the input shaft; and,
a second wedge clutch plate engaged with the second inner race and including:
a second wedge surface at the second acute angle with respect to the radial direction; and,
a second width, parallel to the axis of rotation, less than the first width; and,
an actuator system including first and second actuators, wherein:
respective portions of the first and second output surfaces and of the first and second wedge surfaces are aligned such that a line parallel to the axis of rotation passes through the first and second output surfaces and the first and second wedge surfaces;
for a forward connect mode in which the input shaft is rotating in a first rotational direction:
the first actuator is arranged to displace the first wedge plate to contact the first output surface with the first wedge surface; and,
the first wedge plate is arranged to rotate with respect to the first inner race to displace the first wedge plate radially outward to non-rotatably connect the first inner race and the output shaft; and,
for a reverse connect mode in which the input shaft is rotating in a second rotational direction opposite the first rotational direction:
the second actuator is arranged to displace the second wedge to contact the second output surface with the second wedge surface; and, the second wedge plate is arranged to rotate with respect to the second inner race to displace the second wedge plate radially outward to non-rotatably connect the second inner race and the output shaft.

15. The disconnect clutch of claim 14, wherein:
for a coast mode, torque is received by the output shaft;
for a switch from the forward mode to the coast mode, the first wedge plate is arranged to rotate with respect to the first inner race to enable independent rotation of the first wedge plate with respect to the output shaft; and,
for a switch from the reverse mode to the coast mode, the second wedge plate is arranged to rotate with respect to the second inner race to enable independent rotation of the second wedge plate with respect to the output shaft.

16. The disconnect clutch of claim 14, wherein
the first clutch includes a first spring connected to the output shaft and the first wedge plate and urging the first wedge plate in a first axial direction;
the second clutch includes a second spring connected to the output shaft and the second wedge plate and urging the second wedge plate in a second axial direction, opposite the first axial direction;
to initiate the forward mode, the first actuator is arranged to displace the first wedge plate in the second axial direction; and,
to initiate the reverse mode, the second actuator is arranged to displace the second wedge plate in the first axial direction.

17. The disconnect clutch of claim 14, wherein:
the first clutch includes a first spring connected to the output shaft and the first wedge plate and urging the first wedge plate in a first axial direction;
the second clutch includes a second spring connected to the output shaft and the second wedge plate and urging the second wedge plate in a second axial direction, opposite the first axial direction;
to initiate the forward mode, the first actuator is arranged to be deactivated and the first spring is arranged to displace the first wedge plate in the first axial direction; and,
to initiate the reverse mode, the second actuator is arranged to be deactivated and the second spring is arranged displace the second wedge plate in the second axial direction.

18. The disconnect clutch of claim 14,
wherein:
the first actuator includes a first electric motor with a first ball screw engageable with the first wedge plate, and the first electrical motor and the first ball screw are arranged to axially displace the first wedge plate; and,
the second actuator includes a second electric motor with a second ball screw engageable with the second wedge plate, and the second electrical motor and the second ball screw are arranged to axially displace the second wedge plate; or,
wherein:
the first actuator includes a first magnet arranged to axially displace the first wedge plate; and,
the second actuator includes a second magnet arranged to axially displace the second wedge plate.

* * * * *